United States Patent
Clemm et al.

(10) Patent No.: US 7,734,588 B2
(45) Date of Patent: Jun. 8, 2010

(54) METHOD AND SYSTEM FOR CREATING MANAGEMENT INFORMATION BASE SPECIFICATIONS

(75) Inventors: Alexander Clemm, Los Gatos, CA (US); Jung Tjong, Sunnyvale, CA (US); Eshwar Rao Yedavalli, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 11/265,963

(22) Filed: Nov. 3, 2005

(65) Prior Publication Data

US 2007/0100871 A1    May 3, 2007

(51) Int. Cl.
*G06F 17/00* (2006.01)
*G06F 7/00* (2006.01)
*G06F 15/173* (2006.01)
*G06F 15/177* (2006.01)

(52) U.S. Cl. .................. 707/634; 707/827; 709/223; 715/736

(58) Field of Classification Search ................ 707/102, 707/104.1, 100; 709/223; 715/513, 205, 715/234, 736
See application file for complete search history.

(56) References Cited

U.S. PATENT DOCUMENTS 6,085,237 A     7/2000    Durham

2003/0163479 A1 *    8/2003    Mathews et al. ............ 707/102

OTHER PUBLICATIONS

Yoon, Jeong-Hyok, Ju, Hong-Taek, Hong, James W, "Development of SNMP-XML translator and gateway for XML-based integrated network management", International Journal of Network Management 2003, vol. 13, pp. 259-276.*
MIB Explorer v1.6.3 online user manual, obtained from Jul. 28, 2004 cache copy of www.mibexplorer.com website found through Wayback Machine www.archive.org.*
MIB Explorer v1.6.3 online user manual, Fock, Frank, obtained from Jul. 28, 2004 cache copy of www.mibexplorer.com website found through Wayback Machine www.archive.org, pp. 1-6, 14-25, 54-55, and 64-66.*
MIB Explorer v1.6.3 online user manual, Fock, Frank, obtained from Jul. 28, 2004 cache copy of www.mibexplorer.com website found through Wayback Machine www.archive.org, all pp. (1-97).*

* cited by examiner

*Primary Examiner*—James Trujillo
*Assistant Examiner*—Bruce M Moser
(74) *Attorney, Agent, or Firm*—Trellis IP Law Group, PC

(57) ABSTRACT

A method and apparatus for creating management information specifications in a schema by a user. According to various embodiments of the method, a first file is defined by using a metaschema. The metaschema is represented in a schema definition format. Subsequently, a second file corresponding to the first file is defined. The second file includes directives for depicting various elements of a metaschema. The user is then prompted to fill various fields that correspond to the various elements of the metaschema. As a result, the management information specifications are included in a document corresponding to the metaschema. The management information specifications in the document are then converted to form the management information specifications into a metaschema document. The metaschema document represents a schema. The schema includes the management information specifications.

24 Claims, 8 Drawing Sheets

METHOD AND SYSTEM FOR CREATING MANAGEMENT INFORMATION BASE SPECIFICATIONS

BACKGROUND OF THE INVENTION

1. Field of Invention

Embodiments of the invention relate in general to network management technology. More specifically, the embodiments of the invention relate to methods and systems for creating Management Information Base (MIB) specifications.

2. Description of the Background Art

With the advent of exchange of management information between network devices, there has been a tremendous growth in the area of network management technology. For example, the network devices include routers, gateways, and switches. One such network management technology is a Simple Network Management Protocol (SNMP). The SNMP is an application layer protocol that facilitates the exchange of management information between the networked devices. The SNMP uses a logical database of network management information. Such a logical database is often referred to as a Management Information Base (MIB). Management applications can use SNMP to access the MIB for managing the network performance, detecting and solving the network problems, and planning for the network growth.

One fundamental problem with the MIB is defining MIB specifications or a schema. The MIB includes various MIB objects. The MIB is a conceptual database and the queries are addressed through Object Identifiers (OIDs). The MIB includes various MIB objects. The MIB objects are addressed using the OIDs. Further, there are instances of MIB object types, which are specified using a specification language. The specification language or metaschema for SNMP MIB is referred to as Structure of Management Information (SMI). For example, Structure of Management Information version 1 (SMIv1) or a Structure of Management Information version 2 (SMIv2). The SMI defines MIB object types that can be accessed, inspected, and altered through operations of the SNMP protocol.

According to one of the conventional methods, a graphical environment is used for creating the MIB specifications. For example, the user can enter various artifacts through a series of pop-up windows. However, this method is more suitable for MIB experts than for actual MIB developers. This is because the conventional methods do not provide guidelines to the user for creating the MIB specifications. Further, the conventional methods do not facilitate additional support in entering the artifacts. Furthermore, conventional methods do not facilitate creation of the MIB specifications, depending on the earlier user input.

In addition, the user may not be aware of many guidelines and best practices that are available for creating the MIB specifications. The conventional methods do not also guide the user to create syntactically and semantically correct MIB specifications that conform to the best practices.

DETAILED DESCRIPTION OF EMBODIMENTS OF THE INVENTION

The various embodiments of the invention provide a method, a system, and a computer program product for creating management information specifications in a schema by a user. The embodiments of the invention provide a method that enables the creation of the management information specifications in an interactive and integrated manner. The method includes defining a first file, by using a metaschema equivalent to SMIv2 specification. Subsequently, a second corresponding to the metaschema (first file) is defined. The second file includes directives for user input fields associated with the various elements of the metaschema that are used for prompting and guiding user in creating the management information specifications. The resulting management information specifications itself are formed in a metaschema document. The MIB specifications in the metaschema document are represented in a schema. The schema includes the management information specifications.

In accordance with an embodiment of the invention, the management information specifications are Management Information Base (MIB) specifications. In accordance with an embodiment of the invention, the metaschema is in an XML Schema Definition (XSD) format. In accordance with an embodiment of the invention, the management information specifications are in an XML format.

Figure 1:
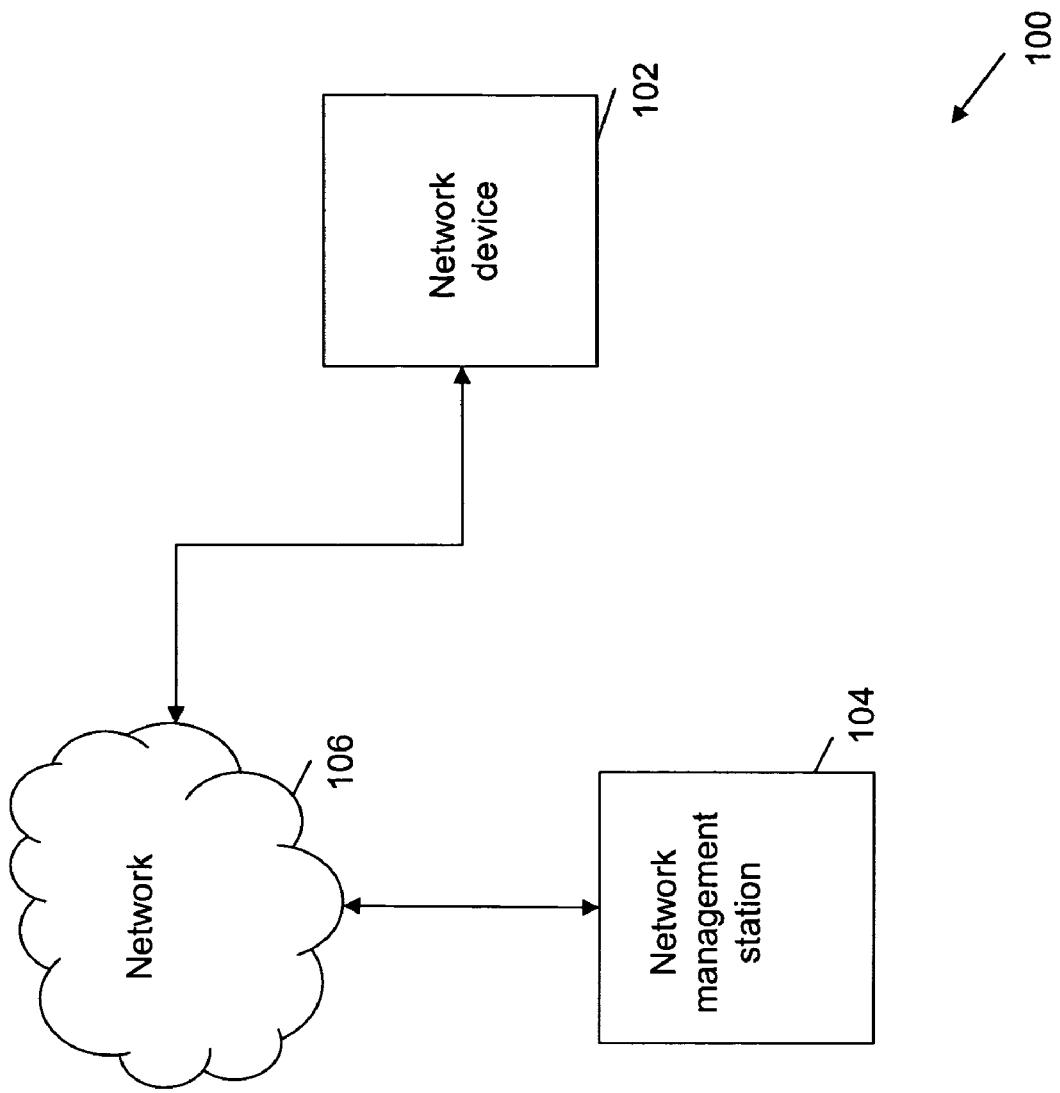
FIG. 1 illustrates a network environment, in accordance with an exemplary embodiment of the present invention.

FIG. 1 illustrates a network environment 100, in accordance with an exemplary embodiment of the present invention. Network environment 100 includes one or more network devices, including a network device 102, and a network management station 104 connected to a network 106.

Network device 102 can be a switch, a router or a network gateway. Network 106 can be a collection of individual networks, interconnected to each other and functioning as a single large network. Examples of network 106 can include, but are not limited to, a Local Area Network (LAN), a Wide Area Network (WAN), a Metropolitan Area Network (MAN), and a Virtual Private Network (VPN).

Network device 102 executes an Internetworking Operating System (IOS). Exemplary IOSs, among others, include Cisco Internetwork Operating System (IOS) and CATalyst Operating System (CATOS). Network device 102 can also execute various applications under the control of an operating system. The operating system can supervise operation of the various applications and communicates to network 106 by using an agreed-upon network communication protocol. An example of the agreed-upon network communication protocol can be a Simple Network Management Protocol (SNMP).

The various applications may include an SNMP agent that can send and receive messages using SNMP.

According to an embodiment, network device 102 stores its current configuration, and other related information in management information. In accordance with another embodiment, network device 102 stores its current configuration, and other related information in a Management Information Base (MIB). Information in the MIB is organized in one or more MIB variables. Network management station 104 can send 'get' and 'set' commands to network device 102, to retrieve or set values of the MIB variables. Examples of the MIB variables include sysUP time, tcpConnstate, SysObjID, and SysOID.

Network management station 104 can be a general-purpose computer system. In various embodiments, the general-purpose computer system includes an operating system (OS), a processor, and a memory space in a hard disk. Examples of processors include Pentium®, Centrino®, Power PC®, Digital Signal Processor (DSP), and so forth. Examples of OS include Linux, Windows, Solaris, AIX, and Mac.

In various embodiments, network management station 104 includes a network management system. Network management station 104 can execute one or more programs that perform various network management activities, such as performing configuration or monitoring faults. Network management station 104 also executes a Basic Input/Output System (BIOS) that controls and governs interaction of the upper logic layers of the software components with the hardware of network management station 104. For example, BIOS includes a Phoenix ROM BIOS. Network management station 104 also executes operating system that supervises and controls operation of upper-level application programs. For example, operating system can be a Microsoft Windows NT® operating system.

Figure 2:
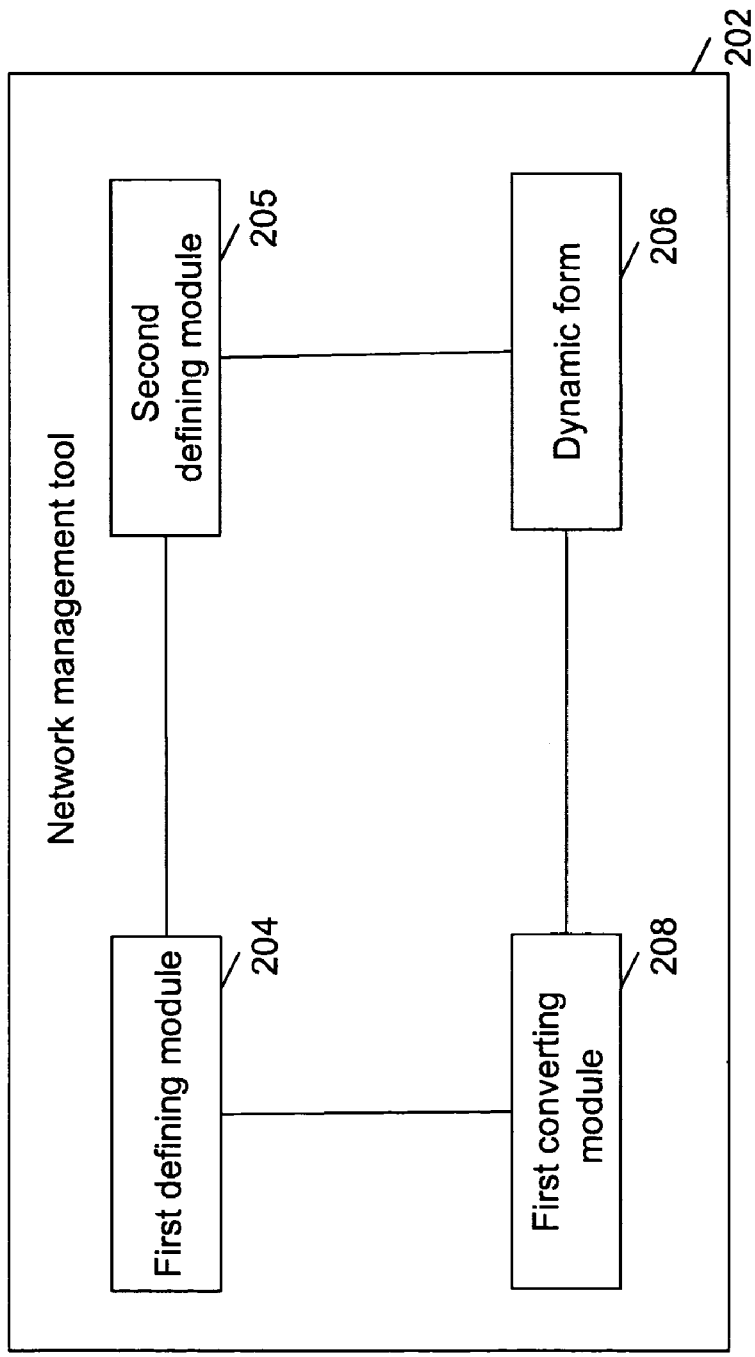
FIG. 2 illustrates a Management Information Base (MIB) specification tool for creating MIB specifications in a schema by a user, in accordance with an embodiment of the present invention.

FIG. 2 illustrates a MIB specification tool 202 for creating management information specifications in a schema by a user, in accordance with an embodiment of the present invention. According to various embodiments of the invention, management information specifications can be created for the MIB. MIB specification tool 202 includes a first defining module 204, a second defining module 205, a dynamic form 206, and a first converting module 208. In an embodiment of the invention, first defining module 204 defines a metaschema that is the first file. Subsequently, second defining module 205 defines a second file corresponding to the metaschema (the first file). The second file includes directives for user input fields associated with the various elements in the metaschema. The various elements included in the second file define dynamic form 206. Dynamic form 206 can prompt the user to fill the various fields corresponding to the various elements of the metaschema, to specify management information specifications stored as a document. The management information specifications stored as the document are then sent to first converting module 208 that converts it into a metaschema document.

In accordance with an embodiment of the invention, the management information specifications are Management Information Base (MIB) specifications. In accordance with an embodiment of the invention, the metaschema is in an XML Schema Definition (XSD) format. In accordance with an embodiment of the invention, the management information specifications are in an XML format.

In various embodiments of the invention, the XML format can be either a Structure of Management Information version 2 (SMIv2) or a Structure of Management Information version 1 (SMIv1).

Figure 3:
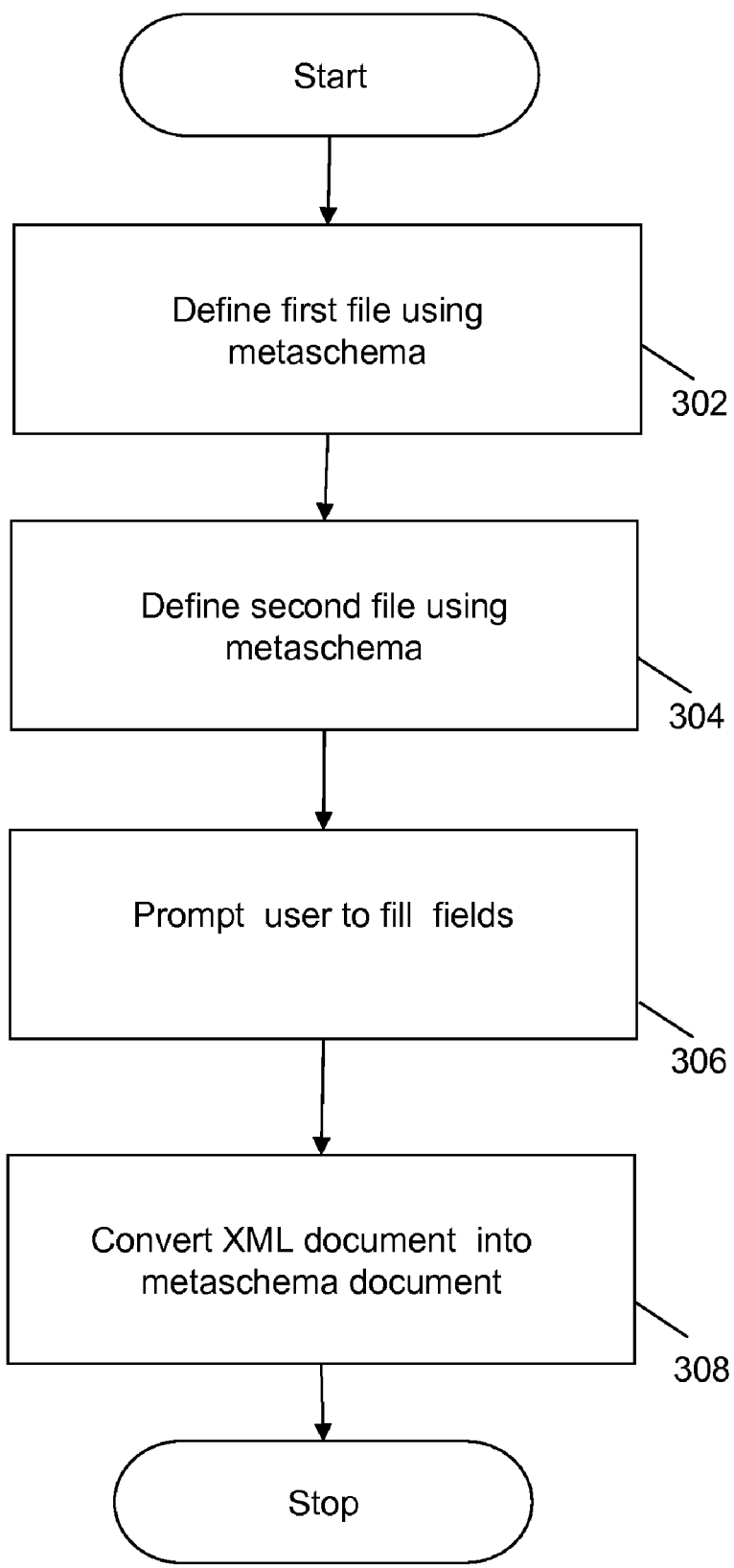
FIG. 3 is a flowchart illustrating the requisite steps involved in creating management information specifications in a schema by a user, in accordance with an embodiment of the present invention.

FIG. 3 is a flowchart illustrating the requisite steps involved in creating management information in a schema by a user, in accordance with an embodiment of the present invention. At step 302, a first file by using the metaschema is defined. Subsequently, at step 304 a second file corresponding to the first file is defined. The second file includes directives for depicting various elements of the metaschema. At step 306, a user is prompted to fill various fields present in dynamic form 206. The various fields are defined at step 304 and correspond to the various elements of the metaschema that are present in the second file. Once the user has filled the various fields, the process of specifying the management information specifications is facilitated. The management information specifications are present in a document corresponding to the metaschema. At step 308, the document is converted into a metaschema document. The conversion of the document results in a schema. The schema includes management information specifications.

In various embodiments of the invention, steps 302 to 306 can be performed in an integrated manner. As a result of integration, steps 302 to 306 become transparent to the user. Consequently, the management information specifications can be created in a seamless manner. In various embodiments of the invention, step 306 has been further explained in conjunction with FIG. 5.

In accordance with an embodiment of the invention, the management information specifications are Management Information Base (MIB) specifications. In accordance with an embodiment of the invention, the metaschema is in an XML Schema Definition (XSD) format. In accordance with an embodiment of the invention, the management information specifications are in an XML format.

Figure 4:
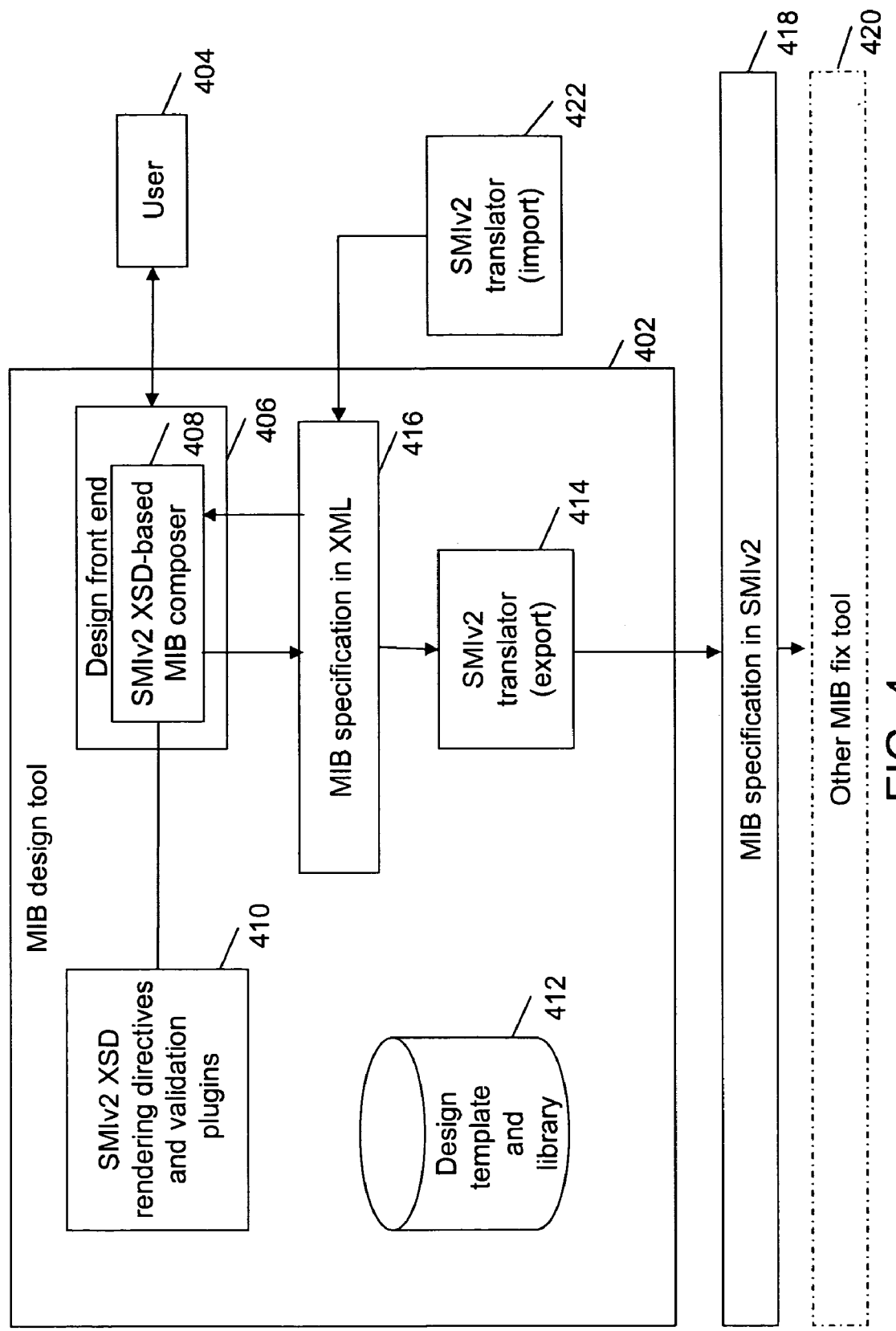
FIG. 4 illustrates a design tool for creating the management information specifications in a schema by a user, in accordance with an embodiment of the invention.

In various embodiments of the invention, MIB Specification tool 202 can be referred to as a MIB design tool. FIG. 4 illustrates MIB design tool 402 for creating the MIB specifications in a schema by a user, in accordance with an embodiment of the invention. MIB design tool 402 includes a design front end 406, SMIv2 XSD rendering directives and validation plugins 410, a MIB specification in XML 416, a design template and library 412, and a SMIv2 translator (export) 414. Other tools such as MIB fix tool 420 can also be provided. Design front end 406 includes a SMIv2 XSD-based MIB composer 408. A SMIv2 translator (import) 422 is also present in the system. In an embodiment, the user interacts with MIB design tool 402 through design front end 406. Design front end 406 is provided with the directives of the second XML file by SMIv2 XSD rendering directives and validation plugins 410. SMIv2 XSD-based MIB composer 408 sends the MIB specification in XML format to MIB specification in meta-SMIv2 416. The MIB specifications in the XML format are then converted by SMIv2 translator (export) 414 to MIB specifications in the metaschema. Subsequently, the MIB specifications in the metaschema format are stored in MIB specification in SMIv2 418. MIB specifications in SMIv2 can be converted to MIB specifications in the XML format by MIBv2 translator (import) 422. The details of MIB design tool 402 has been explained in detail with conjunction to FIG. 6.

In various embodiments of the invention SMIv2 translator (export) 414 is herein after referred to as first converting module 208. Further, in various embodiments of the invention SMIv2 translator (import) 422 is herein after referred to as second converting module 610.

Figure 5:
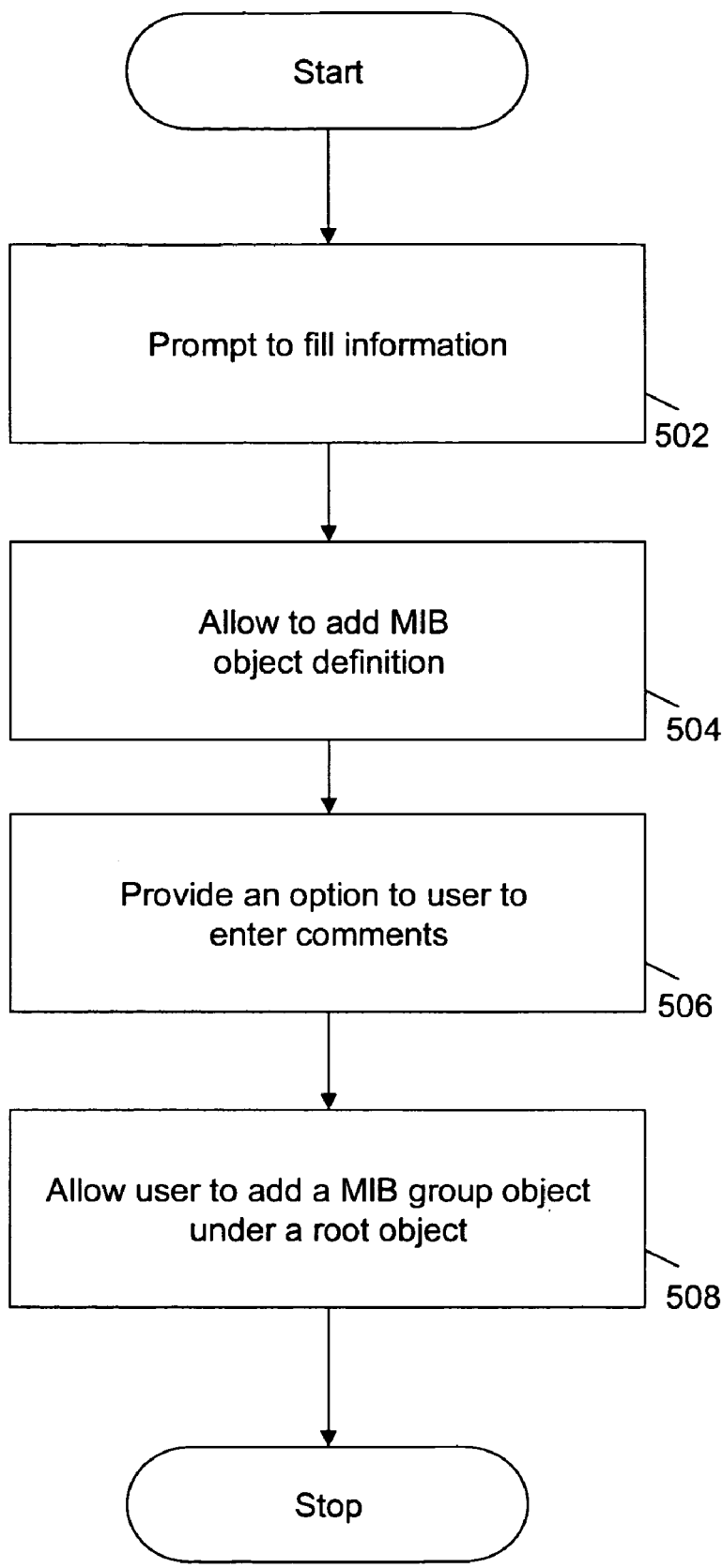
FIG. 5 is a flowchart illustrating the steps involved in prompting a user for filling a plurality of fields, in accordance with an embodiment of the present invention.

FIG. 5 is a flowchart illustrating the detailed steps involved in prompting a user for filling a plurality of fields, in accordance with an embodiment of the present invention. At step 502, the user is prompted to fill information. According to an embodiment, the information can depend on the type of field that is filled by the user. For example, the information can be for additional security clauses depending on max access clause, index and augmentation clauses for tables. Also, certain fields can be pre-populated. For example, prefix for object names in a table may be pre-populated. Further, picklists can get pre-populated on the basis of the MIB definitions that are imported by the user. Further, according to another embodiment, the information can relate to general contact information of the user, revision date and comments, object definitions that have been imported, object identifiers for a root object of the MIB, prefix for object definitions, and addition of design elements. At step 504, the user is allowed to add an MIB object definition. At step 506, an option is provided to the user to enter comments corresponding to the MIB object definition. If the user specifies an object to be writable, then the user is prompted to select from a set of choices for reboot behavior of the device. For example, the reboot behavior would revert back to default upon reboot, or a value that is preserved even after reboot. Subsequently, depending on the user's choice, a corresponding text is generated. The text will be included with the object's description clause in the SMIv2 definition. At step 508, the user is allowed to add an MIB group object under a root object.

In various embodiments of the invention, steps 502 to 508 are performed on filling dynamic form 206. By performing steps 502 to 508, the user does not have to memorize the metaschema for MIB definitions. In various embodiments of the invention, some of the fields can be prepopulated with defaults. Consequently, the user does not have to enter the fields, for example prefix for object names, based on the containing object group name. In addition, for combo boxes the choices offered may depend on earlier input by the user. For example, textual conventions imported from another MIB specification. This helps to maintain integrity of the MIB specifications.

Figure 6:
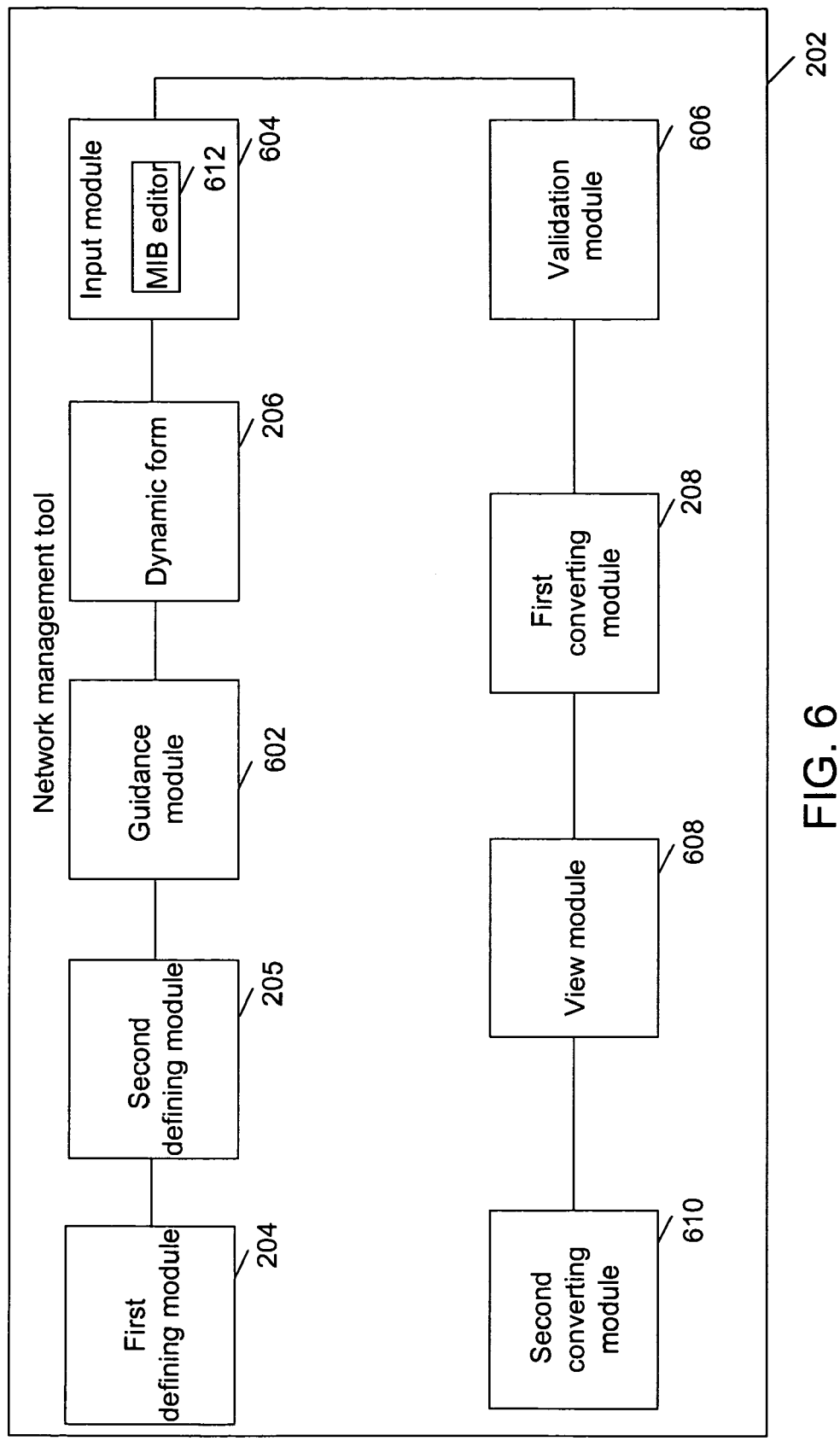
FIG. 6 illustrates a network management tool for creating management information specifications in a schema by a user, in accordance with another embodiment of the present invention.

FIG. 6 illustrates MIB specification tool 202 for creating management information specifications in a schema by a user, in accordance with another embodiment of the present invention. According to various embodiments of the invention, management information specifications can be created for the MIB. MIB specification tool 202 includes first defining module 204, second defining module 205, a guidance module 602, dynamic form 206, an input module 604, a validation module 606, first converting module 208, a view module 608, and a second converting module 610. Input module 604 includes an MIB editor 612. The functionalities of first defining module 204, second defining module 205, dynamic form 206, and first converting module 208 are explained in conjunction with FIG. 2.

According to an embodiment, after defining the second file, including the directives for the various elements of the metaschema by second defining module 205, guidance module 602 equips the user with information and guidance that enables the user to specify the MIB specifications that are syntactically and semantically correct. Dynamic form 206 prompts the user to fill the various fields corresponding to the various elements of the metaschema to specify the MIB specifications. As mentioned earlier, the user is prompted to fill the various fields with the required information, for example information related to contact information of the user, revision date and comments, object definitions that have been imported, object identifiers for a root object of the MIB, prefix for object definitions, and addition of design elements. For example, the design elements can be new attributes, rows, and columns in a table.

According to an embodiment of the invention, after prompting the user to fill the various fields by dynamic form 206, input module 604 facilitates the user to fill the various fields. Input module 604 assists the user to populate SMIv2 language artifacts that may not be straightforward. Various embodiments of the invention provide MIB editor 612 inside input module 604, to pre-populate the plurality of fields that can be modified further or expanded upon by the user. Examples of plurality of fields include, copyright statements, revision history, and certain aspects of description clauses. MIB editor 612 provides a certain degree of validation, and informs the user in case there is a problem in the information that was filled by the user, which might make it an invalid design. For example, the list of best conventions and practices for which the validations provided can be data-type validations and referential integrity violations.

In various embodiments of the invention, an option is provided to the user to enter comments corresponding to the MIB object definition. If a Max Access for an object is selected as 'read-only', 'read-create', or 'read-write', then the user can be prompted to enter the Security Considerations for the object. If the Max Access is selected as "read-create" for an object, MIB Editor 612 provides an additional field to specify what happens to the value after an agent reboot. It is possible that the value remains unchanged, reverts to a well-defined default value, or that the result is implementation-dependent. Further, for each new revision of the MIB definition, MIB Editor 612 provides the user to include comments for the changes planned in the new version. If the data-type of an object is selected as Integer32, then MIB Editor 612 prompts the user to provide a range of values for the object. If the user enables the dynamic row creation option for a table object, MIB Editor 612 will automatically add two columns to this table. One column can be for type row status and the other for storage type.

Various embodiments of the invention provide MIB editor 612 to explain to the user the meaning of the plurality of fields. For example, the meaning can be explained by using a help menu where the user can look up explanations of the different elements found on the form, or tool tips that are displayed when the cursor is place on top of a field, incorporation of a 'what is this link' placed next to the fields, or linking a URL to a Web page with the proper documentation.

Various embodiments of the invention provide MIB editor 612 with drop-down file menus. Furthermore, various embodiments of the invention, in conjunction with MIB editor 612 provide a directory that contains a set of best practices-MIB designs for different categories of MIB specifications. The best practices-MIB designs may be loaded by the user into MIB editor 612 to serve as the starting point to define the MIB. Various embodiments of the invention also provide MIB editor 612 with a link to the best practices-MIB designs. This can be provided in a variety of ways, for example, by using an option while opening the MIB and as a piece of documentation in a help item.

Various embodiments of the invention provide MIB editor 612 a menu option to the user for compiling the MIB. MIB editor 612 supports importing of in addition to SMIv2-based MIB specifications and updates them once they are imported. Various embodiments of the invention enable MIB editor 612 to convert an SMIv1 MIB specification into an SMIv2 MIB specification. Further, MIB editor 612 provides conversion of the SMIv2 MIB specification into the SMIv1 MIB specification. Various embodiments of the invention provide MIB editor 612 with structure templates and an object template. The structure templates include MIB structure. For example, template for header, object definitions, notifications, and conformance statements. The object template corresponds to an object definition. For example, a template for a scalar enum, corresponds to the creation of a table with a dynamic row creation or deletion.

Various embodiments of the invention provide MIB editor 612 to start a new SMIv2 MIB definition, which will be based on a default MIB template. Optionally, the user can select a different template for the overall MIB structure while staffing a new SMIv2 MIB definition. Various embodiments of the invention provide MIB editor 612 to allow the user to add a new object definition, by using the object template. Further, MIB editor 612 will spell check all the description texts, such as the module descriptions, the revision comments, and the object description. The spell check can be included as one of the menu options and can also be triggered as part of the action to convert the MIB into SMIv2.

Various embodiments of the invention provide MIB editor 612 with MIB Header Definition Functions. For example, MIB editor 612 can present a module name, an organization name, status of the module, module description, references, copyright statement, contact information, revision information of the MIB, imported object definitions in the MIB, root OID, prefix for OID, and so forth. MIB editor 612 can check the module name to be of the format CISCO-XYZ-MIB.

Various embodiments of the invention provide MIB editor 612 to allow the user to add a new scalar object definition under a group object. For example, MIB editor 612 requires the user to specify object name, syntax, status, max access, and description. The user can also specify references, units, default value, range, and size.

Various embodiments of the invention provide MIB editor 612 with the object definition-general requirements. For example, MIB editor 612 allows the user to add a new MIB object definition using an object template as the base. Further, MIB editor 612 spell checks all the description texts, such as the module descriptions, the revision comments, and the object description. The spell check can be included as one of the menu options. It can also be triggered as part of the action to convert the MIB into SMIv2.

Various embodiments of the invention provide MIB editor 612 with a data type header that gives the user an option of selecting a suitable syntax for an object. For example, the data type helper provide the user with options related to number, string, IP address, port number, date and time, and OID. Various embodiments of the invention provide MIB editor 612 with a syntax selection method. For example, the user can be provided with a button to trigger a search operation. This can launch a search tool, which can be used by the user to search for an existing Textual Convention (TC) that might be suitable for an MIB definition.

According to an embodiment of the invention, validation module 606 validates the MIB specifications in the XML format by using the MIB design rules. Subsequently, first converting module 208 converts the XML document into a metaschema document. The XML document includes the MIB specifications that are validated. View module 608 facilitates the user in viewing the MIB specifications in the metaschema format. Second converting module 610 converts the schema document into the XML document. As a result of this, the MIB specifications in the XML format can be imported by an XML-based design tool.

Various embodiments of the invention provide a MIB design tool 402 for creating MIB specifications. The MIB specifications can be created in an efficient and an interactive manner by using dynamic form 206. MIB design tool 402 can have complementary tools for addressing similar design process element. The user is free to use either all the design process elements, or, any one of them. For example, different tools that provide guidance to MIB design can include cookbooks, as well as documented lists of MIB design rules documenting industry and Cisco-specific conventions and best practices for the MIB specifications.

Various embodiments of the invention provide MIB design tool 402, including guidance module 602, input module 604, validation module 606, view module 608, and MIB editor 612. The MIB design tool can have alternative tools that address the same design process element since the tools in the MIB design tool can be used in any combination. In addition, guidance module 602, input module 604, validation module 606, view module 608, and MIB editor 612 can be integrated to make the various elements of the design process transparent. For example, the integration can be applied at the level of the MIB IDE (Integrated Development Environment). Further, MIB tool 402 provides the user to access a library of MIB design rules that are in effect at Cisco. The rendering of MIB design rules should be dynamic, which means that the MIB design rules should always reflect the latest revision maintained by MIB design rules.

Various embodiments of the invention allow guidance module 602 to provide access to cookbooks. The cookbooks provide the user with a set of how-to instructions for specifying the MIB specifications. The access can be a documented list of links.

Various embodiments of the invention provide guidance module 602 to offer guidance to novice users during the filling of the various fields of dynamic form 206. Consequently, the novice users do not have to remember or type detailed SMIv2 syntax, since they can be guided by using and filling out SMIv2 artifacts. Guidance module 602 also enables the user to access a library of MIB templates, covering different categories of the MIB specifications with certain design characteristics that can be reused, as a starting point for new MIB definitions. The MIB templates represent the MIB design patterns.

Various embodiments of the invention provide guidance module 602 to offer a documented process wherein the cookbooks, the MIB design rules, and the MIB design patterns are maintained by the user and the MIB design rules. For example, the user can submit a new cookbook, or a MIB design rule, or a design pattern, or an update to an existing cookbook, MIB design rule, or design pattern. These updates can be made available automatically, allowing for the possibility of involving a central authority that can approve, moderate, or object/override.

Various embodiments of the invention provide input module 604 to allow the user to specify the MIB specifications by using a text editor. Input module 604 provides a certain amount of guidance, such as help texts and wizards, among different input choices. It can also provide dynamic forms that ask the user for relevant information and additional questions that help the user populate SMIv2 language artifacts that are not straightforward to use.

Various embodiments of the invention provide input module 604 to allow the user to import the MIB specifications present in the input module 604. Input module 604 allows the user to import an MIB design pattern from an MIB template library in its entirety. Input module 604 also allows the user to insert or append an MIB template "snippet" to an MIB that is being designed. Input module 604 allows the user to export the MIB design as an SMIv2 definition.

Various embodiments of the invention provide validation module 606 to maintain a checklist that the user can observe and validate before submitting the MIB specifications for MIB design review. The checklist specifically includes the list of the MIB design rules. This can be referred to as a soft checker, which minimizes the number of questions asked from the user, for example, by first checking whether the condition holds true, under which a MIB design rule is applied. Various embodiments of the invention provide view module 608 with an MIB beautifier, which makes the MIB format comply with Cisco conventions. Various embodiments of the invention provide view module 608 that allows browsing an MIB definition. For example, view module 608 provides a tree view that allows collapsing or expanding different aspects of the MIB definition, following a file explorer metaphor.

Figure 7A:
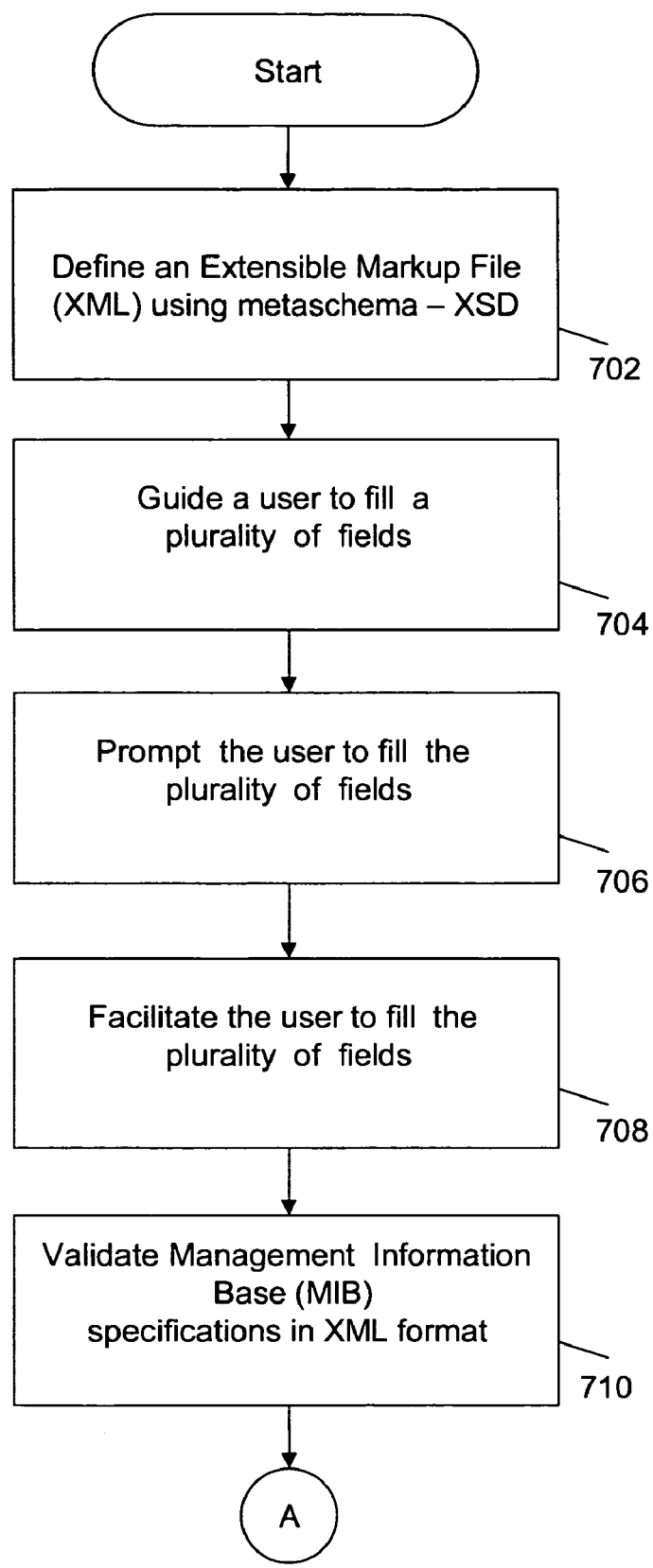
FIG. 7 is a flowchart illustrating the detailed steps involved in creating MIB specifications in a schema, in accordance with an embodiment of the present invention.
Figure 7B:
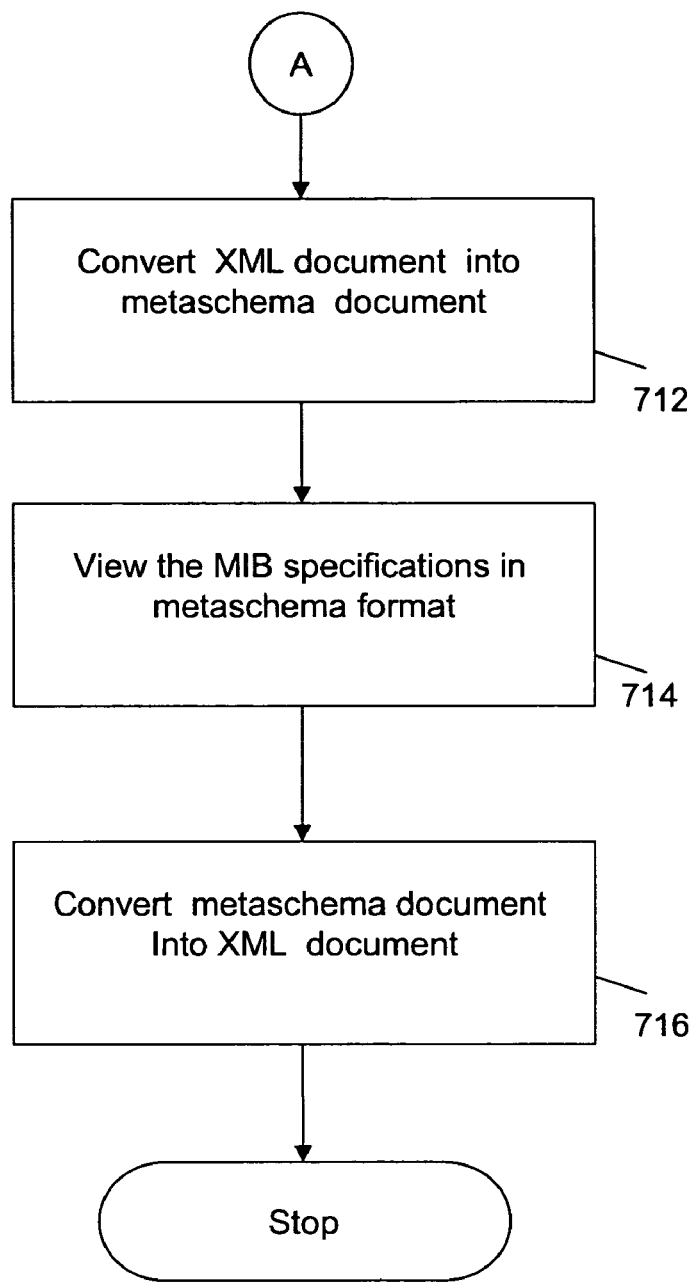

FIGS. 7A and 7B are a flowchart illustrating the detailed steps involved in creating MIB specifications in a metaschema format, in accordance with an embodiment of the present invention. At step 702, a first XML file using a metaschema-XSD is defined. The meta-schema XSD is a metaschema being represented as an XML Schema Definition (XSD). Subsequently, corresponding to the first XML file, a second XML file is included in the first file. The second XML file includes directives for depicting various elements of the metaschema. At step 704, the user is guided to fill various fields. The various fields correspond to the various elements of the metaschema and are present in dynamic form 206. The step of guiding the user enables the user to specify the MIB specifications that are syntactically and semantically correct. At step 706, the user is prompted to fill the plurality of fields. The user can be prompted to fill the plurality of fields with information related to contact information of the user, revision date and comments, object definitions that have been imported, object identifiers for a root object of the MIB, prefix for object definitions, and addition of design elements.

At step 708, the user is facilitated to fill the plurality of fields. The user is assisted to populate SMIv2 language artifacts that are not straightforward. At step 710, the MIB specifications in an XML format are validated. The MIB specifications are validated by using the Cisco MIB Design Rules. At step 712, the XML document is converted into a metaschema document. Consequently, the MIB specifications in the metaschema format are formed. At step 714, the MIB specifications in the metaschema format are viewed. At step 716, the metaschema document is converted into the XML document. This helps in importing the MIB specifications in the XML format by an XML-based design tool.

Thus, by practice of various embodiments of the present invention, existing XML capabilities may be leveraged by using the metaschema-XSD. More specifically, the metaschema-XSD may be employed to define a second XML file that contains directives for how the different elements in the metaschema-XSD should be rendered, including layout for entry fields, tool tips, labels, drop-down choices, and so forth The metaschema-XSD may also include rules for validation that could be performed on user input and for how to default and prepopulate specification elements. Using an existing XML runtime environment, the XML document with the rendering directives and the metaschema-XSD may be used to render the according form and, on user input, to produce XML documents conforming to the metaschema-XSD. By further practice of various embodiments of the invention, logic may be added that allows to convert the resulting XML documents into documents that correspond to the metaschema (e.g., SMIv2). This logic is invoked to result in a valid MIB specification to be output by the tool, as opposed to an XML document. As an intermediate step, an XML document is generated which is transparent to users. Also, by further practice of various embodiments of the invention, logic may be added that allows the conversion of MIB specifications in the metaschema (i.e., SMIv2) into an XML document, where it can be rendered by the XSD-based design tool front end, so existing MIB specifications can be imported. The spirit and scope of embodiments of the present invention includes a design tool driven by a different XSD that abstracts away some of the SMIv2 elements and generates SMIv2 from higher-level constructs. Furthermore, practice of embodiments of the present invention provides the use of dynamic forms based on XSDs to create MIB specifications. XSDs may be created to represent a management metaschema (specifically, SMIv2), and a conversion may be conducted between XML documents corresponding to the XSD to MIB specifications corresponding to this metaschema. Preferably, the conversion is conducted in an integrated manner, along with the capability of generating dynamic forms off an XSD.

Embodiments of the invention have the advantage that the method provided for creating the MIB specifications in the schemas interactive. Further, various embodiments of the invention provide a method for creating the MIB specifications by novice users. The user is guided to fill various fields of a dynamic form with MIB specifications that are syntactically and semantically correct. The user fills various fields of the dynamic form in an interactive manner. The user is prompted to fill the required information through a series of input windows. As a result, the user need not memorize the metaschema for various fields.

The embodiments of the invention facilitate a transparent method for creating the MIB specifications in the schema by the user. The process of the defining of an XML file, prompting the user to fill various fields, and converting the XML document into the metaschema document to create the MIB specifications can be performed in an integrated manner. Consequently, the method is transparent to the user.

Although the invention has been discussed with respect to the specific embodiments thereof, these embodiments are merely illustrative, and not restrictive, of the invention. For example, a 'method for creating MIB specifications in a metaschema format by a user' can include any type of analysis, manual or automatic, to anticipate the needs of emulation of IOS devices. The term "MIB" can include any type of network management information and need not be a specific file, format, data structure or design. Although embodiments of the invention have been described with respect to the XML and XSD formats, any other type of suitable format can be used, as desired.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for creating management information specifications in a schema by a user, the method comprising:
- defining a first file using a metaschema, wherein the metaschema is represented in a schema definition format;
- defining a second file corresponding to the first file, wherein the second file comprises directives for depicting a plurality of elements of the metaschema, and wherein the plurality of elements define a dynamic form;
- displaying the dynamic form for obtaining user input, the dynamic form having a plurality of fields corresponding to the plurality of elements of the metaschema to specify management information specifications, the management information specifications being stored as a document corresponding to the metaschema;
- guiding the user in filling out the plurality of fields such that the management information specifications are syntactically and semantically correct;
- prompting the user to fill the plurality of fields with required information associated with the management information specifications;
- converting the document into a metaschema document, the metaschema document representing a schema, the schema comprising the management information specifications;
- compiling the management information specifications; and
- providing a checklist to the user so that the user can observe and validate the management information specifications.

2. The method of claim 1, wherein the management information specifications are Management Information Base (MIB) specifications.

3. The method of claim 2, wherein the prompting the user to fill the plurality of fields comprises prompting the user to fill information relating to at least one of contact information of the user, revision date and comments, object definitions that have been imported, object identifiers for a root object of the MIB, prefix for object definitions, asking for additional security considerations on writable objects, asking for reboot behavior on writable objects, and asking for index or augmented table while adding a new table object definition.

4. The method of claim 2, wherein the prompting the user to fill the plurality of fields further comprises:
- allowing the user to add a MIB object definition; and
- providing an option to the user to enter comments corresponding to the MIB object definition.

5. The method of claim 2, wherein the prompting the user to fill the plurality of fields further comprises allowing the user to add a MIB group object under a root object.

6. The method of claim 2, further comprising displaying the MIB specifications in the metaschema format.

7. The method of claim 6, further comprising integrating the prompting the user and the displaying the MIB specifications.

8. The method of claim 1, wherein the metaschema is in an XML Schema Definition (XSD) format.

9. The method of claim 1, wherein the management information specifications is in an XML format.

10. The method of claim 1, further comprising:
- facilitating the user for filling the plurality of fields, the facilitating comprising assisting the user to populate SMIv2 language artifacts.

11. The method of claim 10, wherein the facilitating the user for filling the plurality of fields comprises providing a plurality of structure templates, the plurality of structure templates comprising a MIB structure.

12. The method of claim 10, wherein the facilitating the user for filling the plurality of fields comprises providing an object template corresponding to an object definition.

13. The method of claim 10, wherein the facilitating the user for filling the plurality of fields comprises:
- expanding each of the plurality of fields while the user fills each of the plurality of fields based on the user's choice; and
- explaining each of the expanded plurality of fields to the user, the explanation being provided by at least one of help menu and tool tips.

14. The method of claim 1, wherein the metaschema can be in accordance with at least one of the following: Structure of Management Information version 2 (SMIv2) or Structure of Management Information version 1 (SMIv1), wherein the converting further comprises converting the metaschema to a SMIv2 MIB specification or into a SMIv1 MIB specification.

15. A computer-implemented system for creating management information specifications in a schema by a user, the system comprising:
- a processor;
- means for defining a first file using a metaschema, wherein the metaschema is represented in a schema definition format;
- means for defining a second file corresponding to the first file, wherein the second file comprises directives for depicting a plurality of elements of the metaschema, and wherein the plurality of elements define a dynamic form;
- means for displaying the dynamic form for obtaining user input, the dynamic form having a plurality of fields corresponding to the plurality of elements of the metaschema to specify management information specifications, the management information specifications being stored in a document corresponding to the metaschema, wherein the management information specifications are Management Information Base (MIB) specifications;
- means for guiding the user in filling out the plurality of fields such that the management information specifications are syntactically and semantically correct;
- means for prompting the user to fill the plurality of fields with required information associated with the management information specifications, wherein the prompting the user to fill the plurality of fields further comprises:
  - allowing the user to add a MIB object definition; and
  - providing an option to the user to enter comments corresponding to the MIB object definition;
- means for guiding the user in filling out the plurality of fields such that the management information specifications are syntactically and semantically correct;
- means for converting the document into a metaschema document, the metaschema document representing a schema, the schema comprising the management information specifications; and
- means for compiling the management information specifications.

16. A system for creating management information specifications in a schema by a user, the system comprising:
- a processor;
- a first defining module for defining a first file using a metaschema, wherein the metaschema is represented in a schema definition format;
- a second defining module, the second defining module defining a second file corresponding to the first file, wherein the second file comprises directives for depicting a plurality of elements of the metaschema;
  a view module for viewing the management information specifications in the metaschema format, wherein the management information specifications are Management Information Base (MIB) specifications;
  a dynamic form for obtaining user input, wherein the plurality of elements define a dynamic form, the dynamic form having a plurality of fields comprised in the dynamic form corresponding to the plurality of elements of the metaschema to specify management information specifications, the management information specifications being stored as a document corresponding to the metaschema, wherein the dynamic form guides the user in filling out the plurality of fields such that the management information specifications are syntactically and semantically correct, and wherein the dynamic form further prompts the user to fill the plurality of fields with required information associated with the management information specifications; and
  a first converting module for converting the document into a metaschema document, the metaschema document representing a schema, the schema comprising the management information specifications, wherein the management information specifications are then compiled.

17. The system of claim 16, wherein the metaschema is in an XSD format.

18. The system of claim 16, wherein the management information specifications is in an XML Schema Definition (XSD) format.

19. The system of claim 16, further comprising a guidance module for guiding the user to fill the plurality of fields, the guidance enabling the user to specify the MIB specifications that are syntactically and semantically correct.

20. The system of claim 16, further comprising an input module for facilitating the user to fill the plurality of fields comprised in the dynamic form, the input module comprising an MIB editor for providing at least one of a plurality of structure templates, providing an object template corresponding to an object definition, expanding each of the plurality of fields while the user fills the each of the plurality of fields based on the user's choice, and explaining each of the expanded plurality of fields to the user.

21. The system of claim 16, further comprising a validation module for validating the MIB specifications by using MIB design rules.

22. The system of claim 16, further comprising a second converting module for converting the metaschema document into the XML document, the XML document enabling an XSD-based tool design to import the MIB specifications comprised in the XML format.

23. A computer-readable storage medium that stores instructions executable by the processor for creating management information specifications in a metaschema format, the computer-readable storage medium comprising:
  one or more instructions for defining a first file using a metaschema, wherein the metaschema is represented in a schema definition format,
  one or more instructions for defining a second file corresponding to the first, wherein the second file comprises directives for depicting a plurality of elements of the metaschema, and wherein the plurality of elements define a dynamic form;
  one or more instructions for displaying the dynamic form for obtaining user input, the dynamic form having a plurality of fields corresponding to the plurality of elements of the metaschema to specify management information specifications, the management information specifications being stored as a document corresponding to the metaschema;
  one or more instructions for guiding the user in filling out the plurality of fields such that the management information specifications are syntactically and semantically correct;
  one or more instructions for prompting the user to fill the plurality of fields with required information associated with the management information specifications;
  one or more instructions for converting the document into a metaschema document, the metaschema document representing a schema, the schema comprising the management information specifications;
  one or more instructions for compiling the management information specifications; and
  one or more instructions for providing a checklist to the user so that the user can observe and validate the management information specifications.

24. An apparatus for creating Management Information Base (MIB) specifications in a metaschema format, the apparatus comprising:
  a processing system including a processor coupled to a display and user input device;
  a computer-readable storage device including instructions for creating management information specifications executable by the processor, the computer-readable storage device comprising:
  one or more instructions for defining a first file using a metaschema, wherein the metaschema is represented in a schema definition format
  one or more instructions for defining a second XML file corresponding to the first file, wherein the second file comprises directives for depicting a plurality of elements of the metaschema, and wherein the plurality of elements define a dynamic form;
  one or more instructions for displaying the dynamic form for obtaining user input, the dynamic form having a plurality of fields corresponding to the plurality of elements of the metaschema to specify management information specifications, the management information specifications being stored as a document corresponding to the metaschema;
  one or more instructions for guiding the user in filling out the plurality of fields such that the management information specifications are syntactically and semantically correct;
  one or more instructions for prompting the user to fill the plurality of fields with required information associated with the management information specifications;
  one or more instructions for converting the document into a metaschema document, the metaschema document representing a schema, the schema comprising the management information specifications;
  one or more instructions for compiling the management information specifications; and
  one or more instructions for providing a checklist to the user so that the user can observe and validate the management information specifications.

* * * * *